United States Patent [19]

Guermeur et al.

[11] 3,848,140

[45] Nov. 12, 1974

[54] CONTROL CIRCUIT FOR THYRISTORS

[75] Inventors: Georges Roger Guermeur, Belfort; Daniel Seigneur, Bethoncourt, both of France

[73] Assignee: Societe Industrielle Honeywell Bull (Societe anonyme), Paris, France

[22] Filed: Dec. 26, 1972

[21] Appl. No.: 317,895

[30] Foreign Application Priority Data

Dec. 28, 1971 France .............................. 71.47027

[52] U.S. Cl. ................. 307/252, 307/254, 307/296, 307/311

[51] Int. Cl. ........................................... H03k 17/00

[58] Field of Search ......... 307/252 UA, 252 A, 311, 307/254, 2, 296; 328/2; 323/25

[56] References Cited

UNITED STATES PATENTS 3,328,606 6/1967 Pinckaers ........................ 307/252 B 3,708,672 1/1973 Marinkovic ..................... 307/252 A 3,715,605 2/1973 Naber .......................... 307/252 UA 3,723,769 3/1973 Collins ......................... 307/252 UA

*Primary Examiner*—Rudolph V. Rolinec

*Assistant Examiner*—B. P. Davis

*Attorney, Agent, or Firm*—Fred Jacob

[57] ABSTRACT

A circuit is disclosed for controlling the trigger of a thyristor by detection of the passage through zero of the alternating feeding voltage. According to the invention a photocoupler is connected, on the one hand, to a rectifier circuit, which is in turn connected to the terminals of the thyristor, and, on the other hand, to a transistor fed from the alternating voltage. At zero passage the transistor sends to the trigger either a direct signal or a pulse.

12 Claims, 3 Drawing Figures

CONTROL CIRCUIT FOR THYRISTORS

BACKGROUND OF THE INVENTION

The subject matter of the present invention is a control circuit for thyristors, which is especially intended for components consisting of two thyristors, mounted in spade-head form and known under the term "triac" or "alternistor" or "bidirectional thyristors." The control of thyristors is known to be effected by an electrode, called the trigger which renders the thyristor either passing or blocking according to whether a signal is applied to it or not. The thyristor is connected to a power source which either passes or blocks the power. In the case of a triac the control voltage has to be applied to the trigger in synchronization with the passage through zero of the alternating voltage at its terminals so as to avoid a current front $(di)/dt$ which is liable to destroy the triac.

Control circuits which detect the passage through zero of the voltage so as to cause the conduction of one or the other of the thyristors are known. Unfortunately, the voltage which is thus to be detected is the voltage at the terminals of the thyristor-load assembly. In other words, whenever the load of the circuit is a reactance, the passage of the voltage through zero at the terminals of the thyristor is no longer detected. Yet it is precisely this voltage which counts. In the case of an inductive load one must, therefore, provide for a continuous feeding isolated from the power section. On the other hand, since integrated control circuits are commercially available it is necessary to insulate the feeding circuit and the sector by means of a transformer which increases the crowding. The present invention aims at correcting these drawbacks of the known devices so as to make possible smooth functioning of the triac irrespective of the load utilized, especially for motors.

SUMMARY OF THE INVENTION

According to the present invention, a control circuit for the trigger of a triac detects the zero passage through zero of the voltage applied to its terminals. The control circuit comprises a rectifier circuit linked to the terminals of the thyristor and connected with a photo-emission diode which is part of a photocoupler that controls a transistor which sends a signal to the trigger of the triac at the moment the voltage passes through zero. The release of the triac is then carried out only when the passage through zero of the alternating voltage occurs at the triac terminals which permits: the use of any desired load no matter what the limitation of the parameter $di/dt$ of the triac is which increases its operational life. The release also permits the operation of monophase or triphased current and the use of feeding voltages distributed over a large spectrum. The use of a photocoupler accomplishes a good insulation of the control circuits and of the power without the need of a transformer.

BRIEF DESCRIPTION OF THE DRAWINGS

Other characteristics and advantages of the invention will evolve in the course of the following description of some of the types of design with reference to the following illustrations which represent.

DETAILED DESCRIPTION OF THE INVENTION

Figure 1:
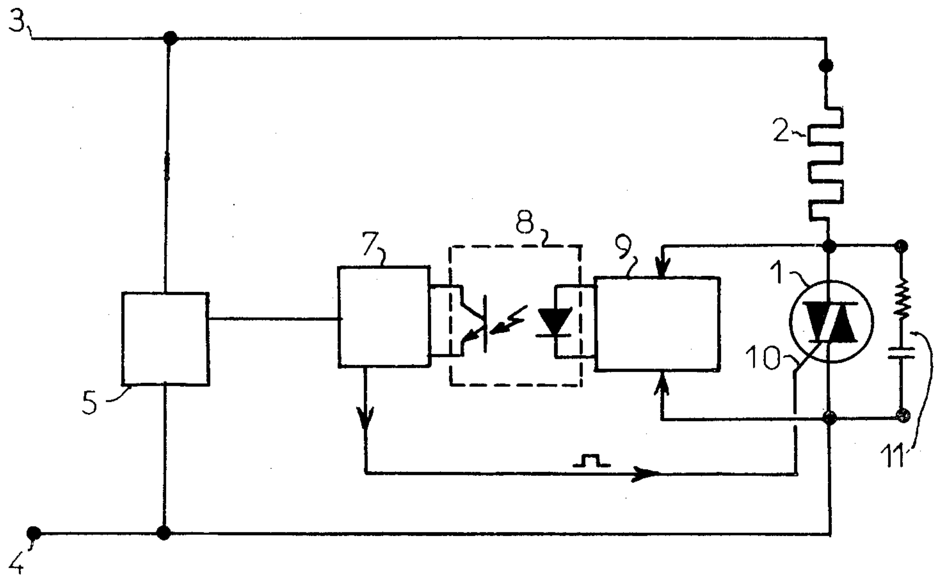
FIG. 1 is a skeleton diagram.

In FIG. 1 the triac 1 is connected in series with a load 2 whose power factor may be anything occurring between the terminals 3 and 4 of an alternating voltage source. Parallel with the triac-load assembly is an amplifier 7 which is fed by a rectifier stage 5 under a continuous voltage. The amplifier 7 is linked with a photocoupler 8 which in turn receives the signal from the output of a stage 9 for zero detection.

At each passage through zero of the voltage of the terminals of the triac the amplifier 7 applies to the trigger 10 of the triac, a control signal which blocks one channel and deblocks the other channel in a reverse direction. A circuit 11 consisting of a resistor and a capacitor in series is connected between the terminals of the thyristor and protects it against excess voltages $(dv)/dt$.

Figure 2:
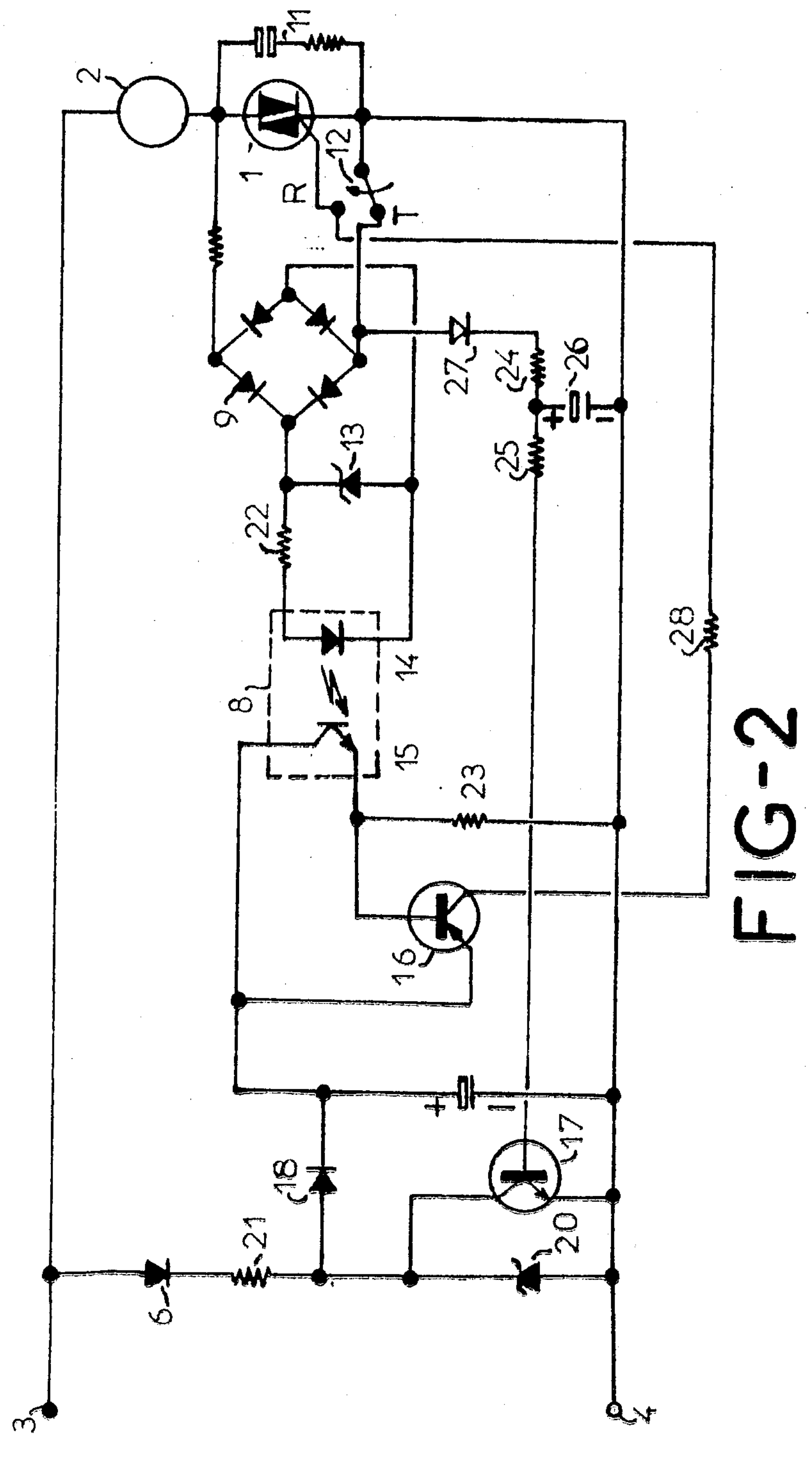
FIG. 2 is a circuit intended for continuous operation.

FIG. 2 is a diagram of an operational circuit which retains the reference marks of FIG. 1 for the same elements. The control of the circuit depends on the state of a circuit breaker 12 which may take either of two positions of work T or of rest R, respectively. The zero-detection circuit 9 consists of a diode bridge one diagonal of which is connected with the terminals of the triac 1 and the second diagonal of which is linked over a resistor 22 to the terminals of photoelectric-emission diode 14. This diode 14 is enclosed in a casing in front of a phototransistor or of a photoreceptive diode 15. A Zener diode 13 has the task of protecting the photoelectric-emission diode 14 in case the triac is defective.

The output signal of the phototransistor 15 is applied to the base of the transistor amplifier PNP 16. The feeding of transistor 16 is effected under continuous voltage due to a transistor 17 whose base is tied to the terminal T over the diode 27 and the resistors 24 and 25. The resistors 24 and 25 are uncoupled by the condensor 26.

The emitter of the transistor 17 is connected with the terminal 4 and its collector is connected to the terminal 3 via the diode 6 and the resistor 21. A Zener diode 20 is mounted between the collector and the emitter of the transistor 17.

The operation of the circuit of FIG. 2 will now be discussed. When the relay 12 is in the rest position R the conducting transistor 17 circuits the voltage in the terminals of the Zener diode 20 and the transistor 16 is therefore not fed which results in nothing being produced.

If the relay 12 is placed in the work position T the transistor 17 is blocked and the voltage of the power sector between terminals 3 and 4 is applied to the terminals of the triac 1 by means of the load 2. The diode bridge 9 restores the alternating voltage. If at the moment of closing of the relay 12 the photoelectric-emission diode 14 sends a light flux to the transistor 15, the transistor 16 being blocked, nothing will occur. Contrariwise, at the first passage through zero, the phototransistor 15 no longer receives any light and is blocked. The transistor 16 becomes passing and transmits a signal through to the trigger 10 of the triac over the resistor 28. The latter energizes itself and the photoelectric-emission diode 14 is no longer passed through by a current, the triac 1 being conductive. The transistor 16 remains in a state of saturation which maintains a permanent current in the trigger 10. When the relay 12 is placed in position R, the transistor 17 passes from the blocked state to the saturated state by the signal applied to its base by the circuit consisting of the diode 27 and the resistors 24 and 25. This prohibits the continued feeding of the control circuit. Moreover, it may be seen that as soon as the position R of 12 is reached the triac deenergizes itself to zero current since the trigger is at the same potential as the terminal T1 of the triac.

In the circuit represented in FIG. 2 the trigger current is applied during the entire time of operation of the triac while this signal is only necessary at the moment of energizing. The result is a slight dissipation of energy.

Figure 3:
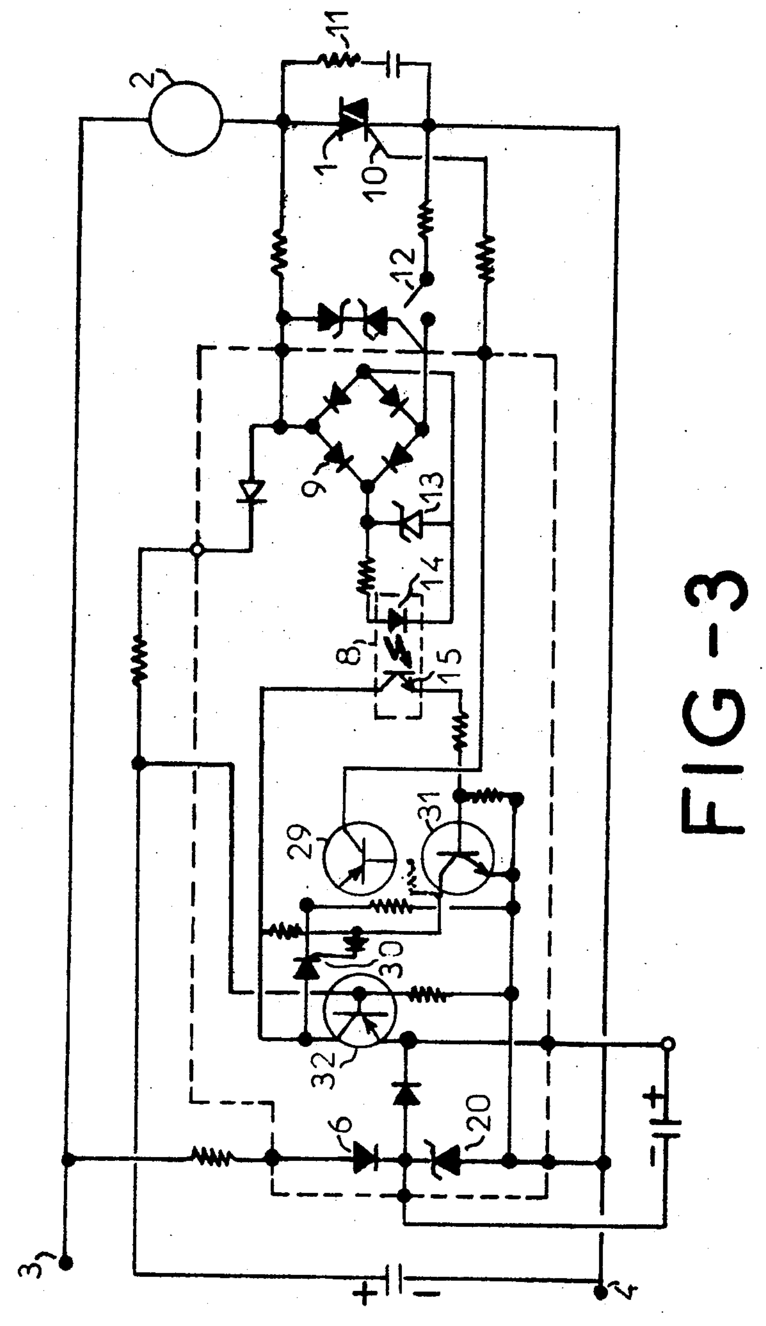
FIG. 3 is a circuit intended for operation in a pulse regime.

FIG. 3 illustrates a circuit in which the control of the trigger achieved in the zero passage of the voltage at the terminals of the triac by means of pulses. One will find here again the majority of the already described elements bearing the same reference marks. The feeder circuit 5 and the amplifier state 7 of FIG. 1 consist of three transistors 29, 31 and 32, and a thyristor 30. The purpose of the transistors 31 and 32 and of the thyristor 30 is the control by the transistors 29 of the generation of a pulse which is applied to the trigger 10 of the triac 1. Different elements concerning conventional techniques of polarization of transistors have not been referenced.

The operation of the circuit of FIG. 3 will now be discussed. When the switch or relay 12 is in rest position the transistors 29, 31 and 32 are blocked. No current is applied to the trigger and the triac 1 is blocked.

When the relay 12 is closed the transistor 32 becomes passing and a current circulates in the photoelectric-emission diode 14. The phototransistor 15 sends a signal to the base of the NPN transistor 31 and brings it to the saturation point. The collector of the transistor 3 is at 0 which inhibits the energizing of the thyristor 30 during an alternation or a partial alternation, depending on the instant of the closing of the switch in relation to the zero passage of the harmonic voltage in the terminals of the thyristor. When the passage through zero occurs the transistor 31 is again blocked and the thyristor 30 energizes itself. The restored voltage rises and again saturates the transistor 31 by means of the phototransistor 15. The transistor 29 receives signals in its base and in its emitter which render it conductive. These signals originate from the collector of the transistor 31 and from the collector of the transistor 32 over the thyristor 30. It feeds the trigger 10 through its collector which energizes the triac 1. During the alternance the photodiode 14 does not emit light any longer, the transistor 31 is blocked by again blocking the transistor 29.

At each zero passage the cycle recurs. The size of the pulses applied to the trigger is directly proportionate to the energizing time of the triac, the proportionality factor being apt to be chosen by a suitable selection of the value of the components, notably of the resistors. The trigger in this circuit is controlled by pulses which reduce the dissipated energy in the trigger. It is evident that these pulses may be obtained by equivalent designs.

The different circuits just described permit the use of triacs irrespective of the nature of the load. They may be designed either on the basis of direct components or in integrated form. The integration may easily be accomplished by that part of FIG. 3 which is surrounded by a dashed line. The link by photocoupler achieves a good insulation, from the electrical view point, of the power and of the control section. It must be clearly understood that these circuits may be used with thyristors mounted in spade-head form or with a single thyristor without exceeding the framework of the invention.

What is claimed is:

1. Control circuit for the trigger of a thyristor or triac by detection of the zero passage through zero of the voltage applied to its terminals, characterized in that a rectifier circuit is linked to the terminals of the thyristor and is connected to a photoelectric-emission diode of a photocoupler which controls a first transistor by sending a signal to the trigger of the thyristor at the moment of the passage through zero of the voltage, the feed voltage of the aforementioned transistor being from the terminals of a Zener diode whose anode is linked to one of the feed conductors and the cathode of a second conductor over a resistor and a diode, a second transistor whose base is tied to the rectifier being mounted in parallel on the Zener diode.

2. Circuit according to claim 1, characterized in that the thyristor being one of the elements of a triac, the rectifier circuit consisting of a diode bridge is connected with the terminals of the triac on a diagonal, the photoelectric-emission diode of the photocoupler being connected with the terminals of the second diagonal, the phototransistor being linked to the base of the first transistor.

3. A circuit for controlling a triac, said control circuit connected to the trigger of said triac so as to send control signals to said trigger, said control circuit comprising:

a zero voltage detection circuit, connected across the terminals of said triac, for detecting a zero voltage across the terminals;

a photocoupler connected to said zero detection circuit, said photocoupler comprising a photoelectric-emission diode and a phototransistor for receiving light emissions from said photoelectric-emission diode, said phototransistor being operative to output a signal in response to a light emission from said photoelectric-emission diode which in turn emits light in response to a non-zero voltage condition in said zero detection circuit; and circuit means connected to said phototransistor and to said trigger and operative to transmit a signal to said trigger upon the occurrence of a lack of signal from said phototransistor.

4. The control circuit of claim 3 wherein said control circuit is connected to a pair of external power terminals and said circuit means for sending a signal to said trigger comprises:

a first transistor which is based connected to said phototransistor, and emitter connected to said trigger of said triac, and a feeder circuit means, connected to the emitter of said first transistor, for feeding a current to said first transistor, said feeder circuit including a switch for enabling or disabling the feeder circuit.

5. The control circuit of claim 4 wherein said zero detection circuit comprises:

a diode bridge, one diagonal of which is connected across the terminals of said triac, and a second diagonal of which is connected to said photoelectric emission diode of said photocoupler.

6. The control circuit of claim 3 wherein said means for sending a signal to said trigger comprises:

a first transistor connected to said trigger;

means for switching said first transistor on so as to produce a single pulse to said trigger, said switching means comprising:

a pair of transistors each of which is connected to said phototransistor and also connected to a thyristor so as to momentarily switch said first transistor on in response to said signal from said phototransistor.

7. A control circuit for an AC load device, comprising in combination:

a thyristor having a gate electrode and a pair of main electrodes connected in series with an AC load;

signal generating means connected to said gate electrode for selectively causing current conduction by said thyristor, said signal generating means including an optically responsive device which upon cessation of optical energization thereof effects current conduction by said thyristor; and light emitting means connected across said thyristor for causing cessation of optical energization of said optically responsive device upon zero crossing of voltage across said thyristor, said light emitting means comprising a series circuit of a rectifying means and a light emitting device whereby said cessation of optical energization occurs in response to non-conduction by said thyristor during a half cycle of voltage across said thyristor followed by zero crossing of the voltage across said thyristor.

8. A control circuit as defined in claim 7 wherein said series circuit also includes a switch for selectively actuating the control circuit.

9. A control circuit as defined in claim 8 wherein said signal generating means maintains said thyristor conductive continuously during half cycles subsequent to said zero crossing.

10. A control circuit as defined in claim 8 wherein said signal generating means produces pulses having a period less than that of a half cycle of voltage across said thyristor.

11. A control circuit for an AC load device, comprising in combination:

a thyristor having a gate electrode and a pair of main electrodes connected in series with an AC load;

signal generating means connected to said gate electrode for selectively causing current conduction by said thyristor, said signal generating means including an optically responsive device which upon cessation of optical energization thereof effects current conduction by said thyristor; and light emitting means connected across said thyristor for causing cessation of optical energization of said optically responsive device upon zero crossing of voltage across said thyristor.

12. A control circuit as defined in claim 11 wherein said light emitting means comprises a series circuit of a light emitting diode and a switch, said switch being selectively controllable initially to produce energization of said light emitting diode during a half cycle of voltage across said thyristor followed by cessation of such energization at a following zero crossing of the voltage.

* * * * *